S. B. CONOVER.

Improvement in Fruit-Baskets.

No. 5,361.

Reissued April 22, 1873.

Witnesses:
Geo. Haynes
J. D. O. Driscoll

S. B. Conover

AM. PHOTO-LITHOGRAPHIC CO. N.Y. (OSBORNE'S PROCESS.)

UNITED STATES PATENT OFFICE.

STEPHEN B. CONOVER, OF NEW YORK, N. Y., ASSIGNOR TO JOHN A. MOUNT.

IMPROVEMENT IN FRUIT-BASKETS.

Specification forming part of Letters Patent No. 131,851, dated October 1, 1872; reissue No. 5,361, dated April 22, 1873; application filed March 24, 1873.

*To all whom it may concern:*

Be it known that I, STEPHEN B. CONOVER, of the city, county, and State of New York, have invented an Improvement in Fruit-Baskets, of which the following is a specification:

This invention is intended to provide a basket for the reception and transportation of fruit, which basket, while having the form found most advantageous by fruit-dealers, may be made with a bottom and sides formed of the same pieces, and not separately, as usual, so that, by dispensing with the separate application of the bottom to the sides, the manufacture of the basket may be carried on with less outlay of labor than has to be expended in making baskets of ordinary construction.

My improved basket is made of three or more splints or pieces of wood which are divided at their ends and so formed and arranged that the bottom of the basket will be polygonal in form, the top circular, or nearly so, and the sides open at suitable intervals, whereby the basket is made of symmetrical form, the tendency of the fruit to pack in transportation reduced, and proper ventilation of the contents provided for.

Figure 1:
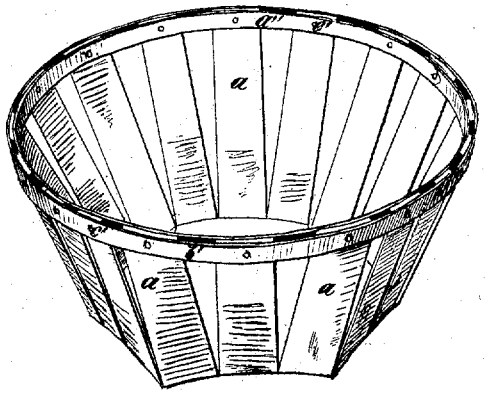
Figure 2:
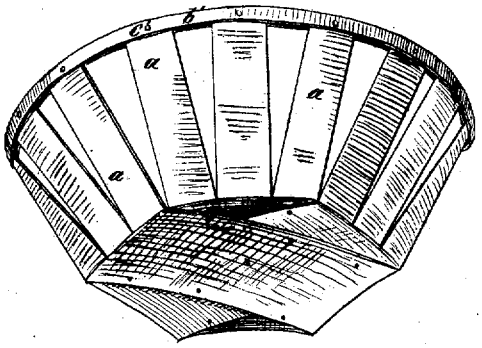
Figure 3:
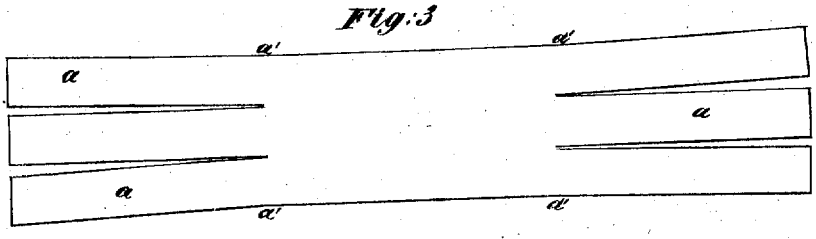

In the accompanying drawing, Figure 1 represents a perspective view of a basket constructed according to my invention as seen from a point above the plane of the top of the basket. Fig. 2 is a perspective view of the same as seen from a point below the plane of the bottom of the basket. Fig. 3 is a detached plan view of one of the pieces or splints used in the construction of the basket.

Similar letters of reference indicate corresponding parts.

Each of the pieces or splints of which the basket is composed is made of thin wood, of the form indicated in Fig. 3, and is at both ends split or divided into a number of parts, *a a*. These splits or divisions extend for about one-third of the length of the splint at either end.

To form a basket three or more of the splints are arranged with their central portions lapping over and at an angle to each other, in such a manner that the points *a'* at the edges of each where the splints are bent on will be brought in close proximity to the overlapping or underlapping splint having its edge next adjacent, as will be more readily understood by reference to Fig. 2. This done, the overlapping central portions of the splints are properly secured together, the end parts *a* then turned upward to the desired angle to the plane of the bottom, as shown in Figs. 1 and 2, and their upper extremities bent or shaped to be curved and fitted between hoops *a''* and *b'*, they being finally confined by nails, rivets, or other appropriate fasteners between and to said hoops. The parts *a* of each splint being bent in a straight line to the bottom portions, when turned up to constitute the sides of the basket, as just set forth, gives a polygonal circumference to the bottom, while the upper ends of the parts, being fitted to the circular hoop or hoops, give a round contour to the top, at the same time, that the parts *a* being brought further apart at the top than at the bottom, openings for the proper ventilation of the contents of the baskets are provided.

The approximately round form given the basket pleases the eye, which is an important element in the trade to which it relates, while the method of construction dispenses wholly with the bottom separately made and applied, as in the round baskets hitherto made; and, furthermore, the basket can be made of the smallest possible number of pieces, by which means it may be manufactured at a great saving of time and labor as compared with other fruit-baskets in use.

Of course, more than three of the pieces or splints may be used, if desired, the number of angles to the bottom being increased in proportion, but the principle of construction remaining the same.

What I claim as my invention, and desire to secure by Letters Patent, is—

A basket constructed of three or more splints which are divided at their ends and crossing each other at their centers, and connected at their upper ends to a circular band so that the bottom of the basket shall assume a polygonal shape, while its top is round, as shown and described.

S. B. CONOVER.

Witnesses:

A. V. BRIESEN,

FRED. HAYNES.